United States Patent
Bullock

[15] 3,679,725
[45] July 25, 1972

[54] COMPOUND [(β-HYDROXYPHENETHYL)AMINO]ETHYL THIOCYANATE AND ACID ADDITION SALTS THEREOF

[72] Inventor: Milon Walker Bullock, Hopewell, N.J.
[73] Assignee: American Cyanamid Company, Stamford, Conn.
[22] Filed: June 11, 1970
[21] Appl. No.: 45,571

Related U.S. Application Data

[60] Continuation-in-part of Ser. No. 669,715, Sept. 22, 1967, abandoned, which is a division of Ser. No. 493,231, Oct. 5, 1965, abandoned.

[52] U.S. Cl..................260/454, 260/306.7, 260/564 E, 424/270
[51] Int. Cl........................................C07c 161/02
[58] Field of Search.................................260/454

[56] References Cited

UNITED STATES PATENTS 3,437,666   4/1969   Pfugfelder et al......................260/454

OTHER PUBLICATIONS

Schatz, "Reaction of Ethylenimines with Acids" (1955) Dissert. Absts. 15 p. 1315 (1955).
Earley et al., " Reactions of Ethylenimines etc."; (1958) Jacs 80 pp. 3458– 3462 (1958).
Markov et al., " 1–drysulfonyl–2–2–dimethylethylenimides etc."; (1965) CA62 pp. 13077– 13078 (1965).
Funke et al., " Action of Ethylenimine on Epoxides," (1953) CA49 p. 1556 (1955).
Tarbell et al., " Acid Catalyzed Ring Opening Reactions etc."; (1950) JACS 72 pp. 2657– 2661 (1950).

Primary Examiner—Lewis Gotts
Assistant Examiner—G. Hollrah
Attorney—Ernest Y. Miller

[57] ABSTRACT

A method of preparing 2-[(β-hydroxy-phenethyl)amino]ethyl thiocyanate by contacting α-phenyl-1-aziridineethanol with thiocyanic acid and products resulting, are described. The products of the process are useful as intermediates in preparing 2,3,5,6-tetrahydroimidazo[2,1-b]thiazoles useful as anthelmintics.

6 Claims, No Drawings

COMPOUND [(β-HYDROXYPHENETHYL)AMINO] ETHYL THIOCYANATE AND ACID ADDITION SALTS THEREOF

This application is a continuation-in-part of application, Ser. No. 669,715, filed Sept. 22, 1967, now abandoned, which is a divisional of application, Ser. No. 493,231, filed Oct. 5, 1965, now abandoned.

SUMMARY OF THE INVENTION

This invention relates to intermediates in a method of preparing substituted 2,3,5,6-tetrahydroimidazo[2,1-b]thiazoles. More particularly, it relates to the preparation of substituted 6-phenyl-2,3,5,6-tetrahydroimidazo[2,1-b]thiazoles by the use of novel intermediates, and methods of preparing the latter.

The new intermediates prepared by the process of the present invention can be illustrated by the following formula:

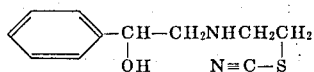

The acid addition salts such as hydrochloride, hydrobromide, p-toluene sulfonate and the like are included within the present invention.

The intermediate directly convertible into the 2,3,5,6-tetrahydroimidazo[2,1-b]thiazole described above is 3-(β-chlorophenethyl)-2-iminothiazolidine.

In preparing the 2,3,5,6-tetrahydroimidazo[2,1-b]thiazole by the process of the present invention the 3β-halo-3-phenethyl thiazolidine is contacted with an alkali metal or alkaline earth metal hydroxide or carbonate in the presence of an organic solvent. The reaction is usually carried out at a temperature within the range of from 40° to 120° C. for a period of from about 10 minutes to 3 hours depending upon the temperature at which the reaction is carried out. Solvents such as chloroform, ethylene chloride, ethyl acetate, etc., can be used.

The 3-β-halophenethyl-2-iminothiazolidine is prepared from the corresponding 2-imino-α-phenyl thiazolidineethanol by reaction with thionyl chloride, phosphorus trichloride, phosphorous tribromide, phosphorus oxychloride or other agents well known to those skilled in the art for transforming alcohols to halides. The reaction is usually carried out by mixing the intermediate with the halogenating agent and heating at a temperature within range of 40° to 120° C. for 5 minutes to 4 hours.

The 2-imino-α-phenyl thiazolidineethanol is prepared by contacting an α-phenyl-1-aziridineethanol with at least 1 molar equivalent of thiocyanic acid is usually prepared in situ by the acidification of any ammonium or metal thiocyanate salt. The reaction is carried out in a lower alkyl alcohol of one to four carbon atoms. It is not necessary to isolate the intermediate and heating the solution of the compound with an acid gives compound (III). The 2-imino-α-phenyl-3-thiazolidineethanol can also be prepared by reacting α-phenyl-1-aziridineethanol with thiourea and a strong acid followed by heating.

The α-phenyl-1-aziridineethanol can be prepared by a reaction of styrene oxide with ethylenimine in an aqueous alkaline mixture as described by Funke et al. Bull. Soc. Chim., France, 1953 (1201–3).

The process of the present invention starting with known reactants can be illustrated by the following flowsheet;

FLOWSHEET

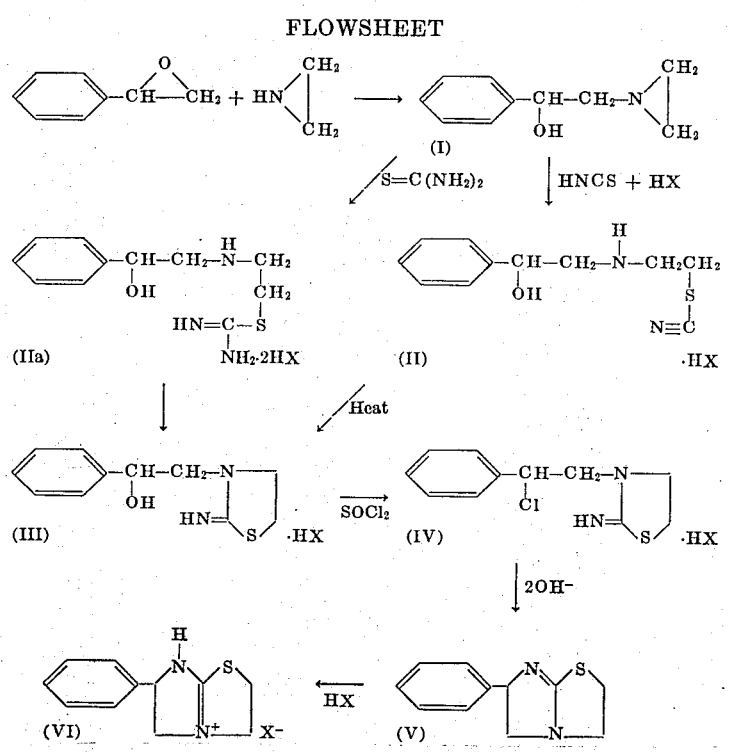

wherein X is a cation.

The preparation of Compound (I) has been described by Funke et al. as hereinbefore indicated. The Compound represented by formula (I) can be transformed into the Compound (II) by reaction of (I) with thiocyanic acid which can be prepared by the acidification of any ammonium or metal thiocyanate salt. When the compound (II) is heated with a strong acid, it is immediately converted to the 2-iminothiazoline (III). Compound (III) can also be prepared by reacting Compound (I) with thiourea and a strong acid which yields the Compound (IIa) which can be converted further to (III) by heating in a suitable reaction medium. The Compound (III) can be converted to the Compound (IV) by contacting (III) with thionyl chloride or other agents such as phosphorus trichloride which are known to transform alcohols to halides. When the Compounds (IV) are contacted with a base and warmed slightly, it is transformed into the 2,3,5,6-tetrahydroimidazo[2,1-b]thiazole free base represented by formula (V). If desired, the free base can be converted to salts, which are represented by formula (VI), by contacting the free base with an acid.

Compounds produced by the process of the present invention were tested by standard parasitological procedures for evaluating anthelmintic efficacy, i.e., (1) in most cases the "critical" test in which the number of worms eliminated in the feces following treatment is compared with the total number of worms present, i.e., the sum of those eliminated and those present at necropsy, and (2) the "controlled" test method in which the average numbers of worms present in treated animals is compared at necropsy several days after treatment with the average number present in similarly infected but untreated animals. Depending upon the host species and the particular helminth studied the infections were experimentally induced or in some cases naturally acquired. The tests showed that dl-2,3,5,6-tetrahydro-6-phenyl-imidazo[2,1-b]thiazole hydrochloride is highly active against a very broad spectrum of nematode parasites of mammals and birds at low dosages, and by varied routes of administration. The following table gives illustrative representative results obtained in testing the above described imidazothiazole, and is not intended to be limiting in regard to dose ranges, routes of administration, or species of nematodes. Data refer to adult helminths unless otherwise indicated.

TABLE

| Host | Doses mg./kg. (or other) | Route of Administration | Approx. % average efficacy | Species of Adult[a] Nematode |
|---|---|---|---|---|
| Mouse | 100 | Oral Gavage | 100 | Syphacia, Aspiculuris |
| | 25 | Oral Gavage | 95–100 | Nematospiroides dubius |
| | 20 | Subcutaneous | 80 | Nematospiroides dubius |
| | (0.1% in feed) | drug-diet | 90 | Ascaris suum larvae |
| | | | 100 | N. dubius |
| Sheep | 3.75–10 | Oral Drench | 100 | Haemonchus contortus |
| | 3.75–10 | Oral Drench | 85–99 | Nematodirus sp. |
| | 5–10 | Oral Drench | 90–100 | Trichostrongylus axei |
| | 10 | Oral Drench | 94 | Ostertagia circumcincta |
| | 15 | Oral Drench | 100 | Ostertagia circumcincta |
| | 7.5–10 | Oral Drench | 95 | Trichostrongylus colubriformis and T. vitrinus |
| | 2.5–7.5 | Subcutaneous | 100 | H.c. |
| | 5–7.5 | Subcutaneous | 95 | O.c |
| | 2.5–7.5 | Subcutaneous | 99 | T.c. and T.v. |
| | 5–7.5 | Subcutaneous | 97–100 | Nematodirus sp. |
| | 15 | Oral Drench | 99 | H.c. larvae |
| | 15 | Oral Drench | 99 | T.c. larvae |
| | 15 | Subcutaneous | 87 | O.c. larvae |
| Cattle | 2.5–10 | Oral Drench | 100 | Haemonchus placei |
| | 7.5–20 | Oral Drench | 80–100 | T. axei |
| | 7.5–20 | Oral Drench | 80–100 | Ostertagi sp. |
| | 5–10 | Oral Drench | 100 | Cooperia sp. |
| Cattle | 7.5 | Oral Drench | 100 | Nematodirus sp. |
| | 5–10 | Oral Drench | 100 | Oesophagostomum sp. |
| | 5–10 | Intramuscular or Subcutaneous | 100 | H.p. |
| | 5–20 | | 90+ | "T. axei |
| | 5–20 | | 90+ | "Ostertagia sp. |
| | 5–10 | | 100 | "Cooperia sp. |
| | 5–10 | Intramuscular | 100 | Nematodirus sp. |
| | 5–10 | Intramuscular | 100 | Oes. sp. |
| | 5–10 | Intramuscular | 100 | Bunostomum sp. |
| | 7.5 | Intraperitoneal | 100 | H.p. |
| | 7.5 | Intraperitoneal | 80 | T. axei |
| | 7.5 | Intraperitoneal | 90 | Ostertagia sp. |
| | 7.5 | Intraperitoneal | 100 | Cooperia sp. |
| | 7.5 | Inreaperitoneal | 100 | Nematodirus sp. |
| | 7.5 | Intraperitoneal | 100 | Bunostomum sp. |
| Swine | 5 | Oral capsule or feed | 100 | Ascaris suum |
| | 10 | In drinking water | 100 | Ascaris suum |
| | 2.5–10 | In drinking water or Oral Capsule | 100 | Metastrongylus sp. |
| | 10–20 | In drinking water | 85 | Oesophagostomum sp. |
| | (0.0125% in feed) | In Feed Continuously | 95 | Ascaris suum larvae |
| Dog | 5 | Subcutaneous | 99 | ancylostoma caninum |
| | 10 | Oral Capsule | 90 | Toxacara canis |
| | 10 | Oral Capsule | 100 | Toxascaris leonina |
| Chicken | 80 | In drinking water | 90+ | Ascaridia galli larvae | a. Unless otherwise indicated.

The following examples illustrate in detail the process of preparing substituted imidazothiazoles.

DETAILED DESCRIPTION

EXAMPLE 1 dl α-Phenyl- 1-Aziridineethanol

To a solution of 43.0 grams (1.0 mole) of ethylene imine and 60.0 grams (0.5 mole) of styrene oxide is added three drops of water and 0.2 grams of potassium hydroxide. The mixture is heated at reflux for 1½ hours. Distillation of the crude product gives 55.6 grams (68 percent) of the crystalline produce. Recrystallization gives pure α-phenyl-1-aziridineethanol with melting point 74°–76° C.

EXAMPLE 2 dl α-Phenyl-1-Aziridinineethanol

A solution of 60.0 grams (0.5 mole) of styrene oxide, 50 ml. of ethanol, and 0.2 grams of potassium hydroxide is prepared. To this solution is added 35.9 grams (0.6 mole) of ethylenimine in portions. The mixture is maintained at 29°–30° C. for 20 minutes, and then is heated at reflux for 30 minutes. The solvent is removed under reduced pressure to provide the crude product. Addition of petroleum ether to the residue gives 8.5 grams of product with melting point 53°–63° C. Distillation of the remaining oil gives an additional 30.7 grams of products, melting point 56°–65° C., the total yield is 48 percent.

EXAMPLE 3 dl 2-Imino-α-Phenyl-3Thiazolidineethnaol Hydrochloride dl

To a solution of 1.17 grams (0.012 mole) of potassium thiocyanate in 10 ml. of ethanol is added 0.011 mole of hydrogen chloride in 3 ml. of ethanol. The mixture is warmed to 50° C., cooled, and the precipitated potassium chloride filtered off. The filtrate, which contains 0.011 mole of thiocyanic acid, is added to a solution of 1.63 grams (0.01 mole) of α-phenyl-1-aziridineethanol at a rate sufficient to maintain the reaction temperature at 30°–35° C. After the addition of the thiocyanic acid is complete, the intermediate product, dl 2-[(β-hydroxyphenethyl)amino] ethyl thiocyanate is treated with a solution of 0.015 mole of hydrogen chloride in 5 ml. of ethanol. Removal of the solvent at reduced pressure gives the rearranged product, melting point 196°–199° C., in a 95 percent yield. Recrystallization from ethanol provides the pure

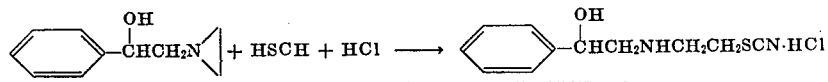

product, with melting point 198°–200° C. The above reaction can be carried out in a lower alkyl alcohol having one to four carbon atoms.

EXAMPLE 4

2-[(β-Hydroxyphenethyl)Amino]Ethyl Thiocyanate Hydrochloride and 2-Imino-α-Phenyl-3-Thiazolidine Ethanol Hydrochloride A mixture of 8.11 g. (0.10 mole) sodium thiocyanate in about 150 ml. of isopropanol is acidified with 10 ml. (0.12 mole) of hydrochloric acid. A solution of 18.0 g.(0.11 mole) α-phenyl-1-aziridineethanol in isopropanol is added over a period of 10 minutes. An additional 8.3 ml. (0.1 mole) hydrochloride is added along with the aziridine. After a few minutes the sodium chloride is removed by filtration leaving a solution containing 2-[(β-hydroxyphenethyl)amino]ethylthiocyanate hydrochloride. The solution is heated for about an hour at about 50° C. and set aside to allow the rearrangement product, 2-imino-α-phenyl-3-thiazolidineethanol hydrochloride to crystallize. The product has a melting point 200°–204° C.

EXAMPLE 5

2-[(β-Hydroxyphenethyl)Amino]Ethyl Thiocyanate p-Toluenesulfonate

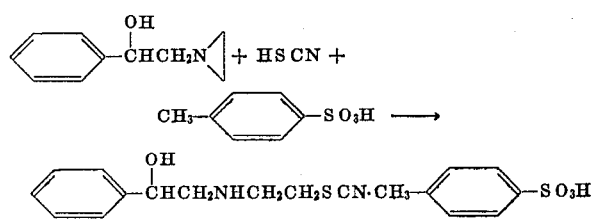

An ice-cold solution of 0.0306 mole of thiocyanic acid is prepared from 1.56 g. (0.032 equivalent) of concentrated sulfuric acid and 2.33 g. (0.0306 mole) of ammonium thiocyanate in 20 ml. of ethanol and is then filtered to remove ammonium sulfate. To this solution is added 11.60 g. (0.061 mole) of p-toluenesulfonic acid. The solution is stirred at 0°–5° C. while a solution of 5.00 g. (0.0306 mole) of a α-phenyl-1-aziridineethanol in 25 ml. of ethanol is added dropwise over 45 minutes. After stirring for one hour at 0°–5° C., and standing in the cold for 18 hours, the precipitate is filtered, washed with ethanol, and dried to give 9.12 g. (75 percent) of product, melting point 216°–222° C. The infrared spectrum has a sharp peak at 2180 cm.$^{-1}$ for the thiocyanate group and no absorption for C = N.

EXAMPLE 6

DL 2-Imino-α-Phenyl-3-Thiazolidineethanol p-Toluene Sulfonate

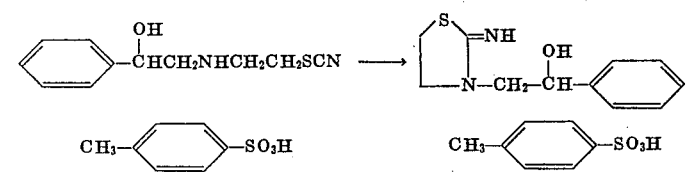

4.50 g. of 2-[(β-hydroxyphenethyl)amino]ethyl thiocyanate p-toluenesulfonate is heated with nitromethane on a steam bath and the hot solution filtered. The filtrate deposited 3.41 g. of crystals on cooling; the product has a melting point 239°–240° C. [lit. melting point 239°–240°]. [A. Baklein et al., Australian J. Chem. 21 1557 (1968)]. The infrared spectrum showed no band near 2180 cm.$^{-1}$, but did have strong bands at 1630 and 1680 cm.$^{-1}$ (C=NH$_2$)
⊕

EXAMPLE 7

2-[(β-Hydroxyphenethyl)Amino]Ethyl Thiocyanate Hydrochlride

To an ice-cold stirred solution of 0.064 mole of thiocyanic acid in 40 ml. of ethanol is added, dropwise, a solution of 3.26 g. (0.020 mole) of α-phenyl-1-aziridineethanol in 15 ml. of ethanol over a period of 30 minutes. The solution is stirred at 0°–5° for 3 hours and then 20 ml. of 4.45 N hydrogen chloride in 2-propanol is added. The cold mixture was filtered, washed with 2-propanol and dried to give 3.81 g. of crystalline product, melting point 128°–130° C. The infrared spectrum has a sharp band at 2180 cm.$^{-1}$ and no absorption for C = N. When the product is heated in solution, it is rearranged as described in Example 6.

EXAMPLE 8 dl 3-(β-Chlorophenethyl)-2-Iminothiazolidine Hydrochloride

To a solution of 2.25 grams (0.009 mole) of 2-imino-α-phenyl-3-thiazolidineethanol hydrochloride in 50 ml. of chloroform is added 3 ml. of thionyl chloride. The mixture is refluxed for 30 minutes, and the solvent removed under pressure to give 1.93 grams of solid product.

EXAMPLE 9 dl 6-Phenyl-2,3,5,6-Tetrahydroimidazo[2,1-b]Thiazole

To a solution of 1.30 grams (0.005 mole) of 3-(β-chlorophenethyl)-2-iminothiazolidine hydrochloride in 50 ml. of chloroform is added a solution of 2.76 grams of potassium carbonate in 10 ml. of water. The mixture is heated at reflux for one hour, cooled, and the layers separated. The organic layer is washed with water and dried over potassium carbonate. Removal of the solvent under reduced pressure gives 1.0 grams of impure solid. Crystallization from ether gives the pure product, melting point 90°–92° C.

EXAMPLE 10 dl 6-Phenyl-2,3,5,6-tetrahydroimidazo[2,1-b]Chloride

To a solution of 6-phenyl-2,3,5,6-tetrahydroimidazo[2,1-b]thiazole in isopropanol is added a solution of hydrogen chloride in isopropanol. The precipitated hydrochloride is filtered, and washed consecutively with ethanol and ether. The crystalline product has melting point 261°–262° C. with decomposition.

EXAMPLE 11 dl 2-Imino-α-phenyl-3-thiazolidineethanol Hydrochloride

When α-phenyl-1-aziridineethanol is mixed with a stoichometric quantity of thiourea in the presence of hydrochloric acid the product obtained is dl 2{2[(β-hydroxyphenyl-ethyl)amino]ethyl }-2-thiopseudourea. The latter product on heating produces the product.

EXAMPLE 12 dl 2-Phenyl 2,3,5,6-Tetrahydroimidazo[2,1-b]Thiazolium Chloride

One gram (0.036 mole) of 3-(β-chlorophenethyl)-2-iminothiazolidine hydrochloride is partitioned between 50 ml. of ethylacetate and a solution of 2.34 g. (0.017 moles) of potassium carbonate in 32 ml. of water. The ethylacetate layer is separated and heated at reflux temperature for 2½ hours. The precipitate of 6-phenyl 2,3,5,6-tetrahydroimidazo[2,1-b]thiazolium chloride is collected by filtration and recrystalized from absolute ethanol to yield 0.3 g. of pure product, melting point 257°–259° C.

I claim:
1. The compound dl-[(β-hydroxyphenethyl)amino]ethyl thiocyanate, and its acid addition salts selected from the group consisting of hydrochloride, hydrobromide and p-toluenesulfonate.
2. The compound according to claim 1, in which the acid addition salt is hydrochloride.
3. The compound according to claim 1, in which the acid addition salt is p-toluenesulfonate.
4. A solution of dl 2-[(β-hydroxyphenethyl)amino]ethylthiocyanate and its acid addition salts selected from the group consisting of hydrochloride, hydrobromide and p-toluenesulfonate in a lower alkyl alcohol solvent having one to four carbon atoms.
5. A solution according to claim 4, wherein the solvent is ethanol.
6. A solution according to claim 4, wherein the solvent is isopropanol.

* * * * *